Aug. 30, 1955  R. RUHE  2,716,280
CHAIN TYPE PIPE CUTTER
Filed April 25, 1952
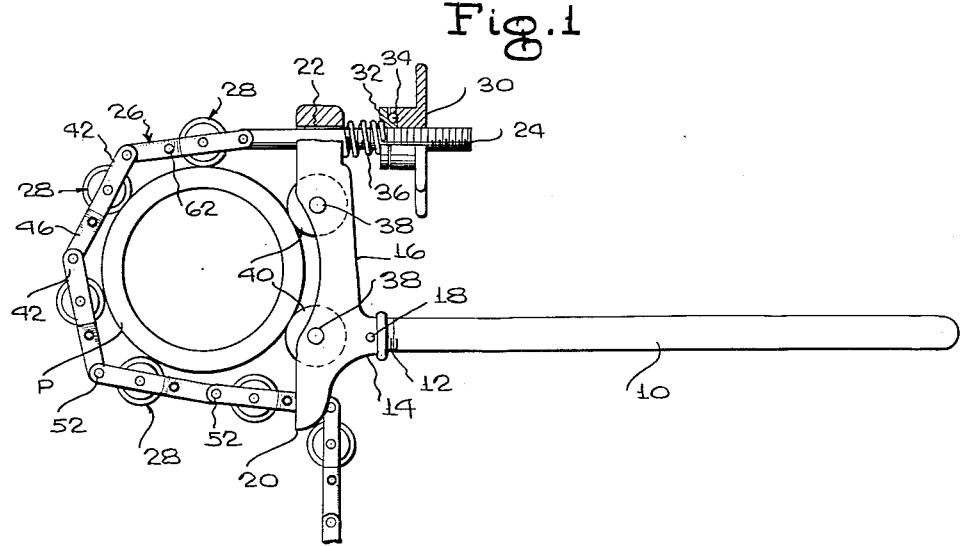
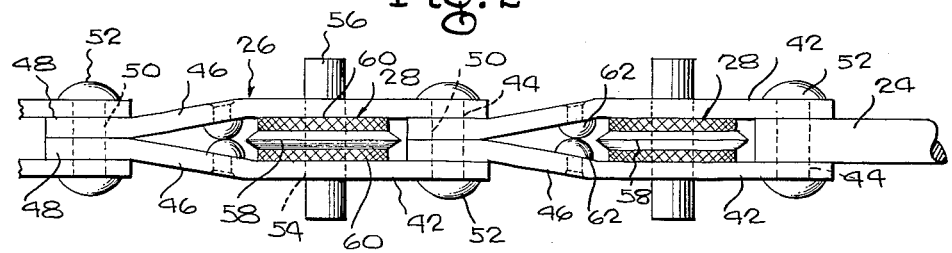
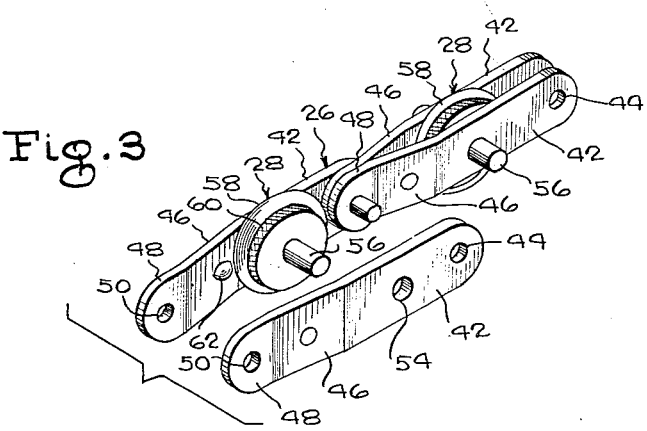
*INVENTOR.*
RALPH RUHE
BY
McMorrow, Berman + Davidson
ATTORNEYS

United States Patent Office 2,716,280
Patented Aug. 30, 1955

2,716,280

CHAIN TYPE PIPE CUTTER

Ralph Ruhe, North Arlington, N. J.

Application April 25, 1952, Serial No. 284,302

1 Claim. (Cl. 30—101)

This invention relates to pipe cutters, and more particularly, has reference to pipe cutters of the type including a cutting chain such as that shown in a patent issued to J. R. Smith, on March 19, 1912, and bearing No. 1,020,580. In this patent a pipe cutter of the chain type was illustrated, and the broad object of the present invention is to provide an improved pipe cutter of the same type.

Accordingly, one important object of the present invention is to provide an improved pipe cutter wherein the cutting wheels carried by the links of the cutter chain will be so formed as to be adapted to grip a cut-off piece of pipe instantaneously when said wheels break through the wall of the pipe, thereby to retain said piece in the tool itself and thus eliminate the danger resulting from flying pieces or chips, while at the same time saving the cut piece of pipe from breakage which might ordinarily result if said piece were permitted to drop to a hard floor surface.

Another important object is to provide a pipe cutter as stated wherein the cutter chain will be formed with links of a novel, improved type that are adapted to reduce the number of link members required as component parts of each link, and that are also adapted to permit preassembly of portions of each link, thus to reduce substantially the cost of manufacture.

Yet another important object is to provide an improved chain for a pipe cutter of the character referred to, wherein there will be embodied spacer means in each link that are specifically adapted to coact with the ends of the next adjacent link in preventing binding of the cutting wheel of the link, thus to permit free rotation of the several cutting wheels of the links and assure better tracking.

A still further important object is to provide a pipe cutter of the character described wherein the means for tightening the cutting chain about a pipe to be cut will be novelly designed in a manner that will permit the pressure of the tool upon the pipe to be increased steadily while yet permitting the pressure-adjusting mechanism of the tool to be operated with complete ease.

Other objects will appear from the following description, the claims appended thereto, and from the annexed drawing, in which like reference characters designate like parts throughout the several views, and wherein:

Figure 1 is a side elevational view of a pipe cutting tool formed in accordance with the present invention as it appears when circumposed about a pipe to be cut, a portion of said tool being shown in section;

Figure 2 is an enlarged, fragmentary, top plan view of the cutter chain; and

Figure 3 is a perspective view of a portion of the cutter chain, one link being partially disassembled to show the details of construction.

The pipe cutting tool constituting the present invention includes an elongated handle 10, having its inner end threaded, as at 12, for engagement within a socket 14 provided adjacent one end of a relatively elongated head 16 adapted to straddle a pipe P to be cut. A set screw 18 can be threaded through the socket wall, for engagement with the handle 10, thereby to prevent accidental rotation of the handle relative to the head.

At one end, the head 16 is bifurcated as at 20, the other end of the head being formed with a smooth-walled opening 22 through which an adjusting screw 24 is loosely extended, for movement of said screw transversely of the head.

A pipe cutter chain has been designated generally by the reference numeral 26, and is provided, at spaced intervals longitudinally thereof, with cutting wheels designated generally at 28. The chain 26 is adapted to be circumposed about a pipe P straddled by the head 16, and for the purpose of tightening said chain against the pipe, an adjusting nut 30 is provided, that is threadedly engaged with the screw 24. A disc 32, constituting part of a ball bearing, is positioned against the inner end of the adjusting nut, and is loose on the screw 24, balls or other antifriction elements 34 being interposed between the disc and nut. A pressure spring 36 is interposed between the disc and the adjacent end of the head 16. By reason of this construction, it will be readily appreciated that on adjustment of the nut 30 longitudinally of the screw 24, rotation of said nut will be permitted with maximum ease and facility, the disc 32 remaining stationary and being adapted to place increased tension on the spring 36.

Spaced longitudinally of the head 16 are cutting wheels 40, rotatably mounted upon pins or shafts 38 journaled in the head.

The particular construction of the cutter chain 26 is of importance, and is shown to advantage in Figures 2 and 3. As will be noted from these figures, each link of the cutter chain includes a pair of identical, though opposite, link members 42, each of which is of integral formation and is formed to a relatively substantial length.

Each of the link members 42 has a first portion at one of its ends offset relative to the other end thereof, said link members having straight, spaced apart, parallel end portions at other end formed with pin-receiving openings 44 aligned transversely of the link. The offset first portions of the link members 42 are shorter in length than the second portions of the link members 42. Intermediate the first and second portions, the link members 42 are formed with intermediate portions 46 that converge toward the first portions of the link members, said first portions of the link members being designated 48 and being of straight formation, the first portions 48 of one link contacting and being partially lapped by and embraced between the spaced apart ends of the link next adjacent.

Formed in the contacting first portions 48 of the link members of each link are registering openings 50, receiving a connecting pin 52, said pin 52 extending through the lapping portions of adjacent links and pivotally connecting the same for the purpose of articulating the cutter chain.

In the spaced apart intermediate portions of the link members of each link, I form transversely aligned openings 54, receiving a cutting wheel shaft 56 for the purpose of rotatably mounting a cutting wheel 58 between said spaced end portions of the link members. As will be noted, each cutting wheel 58 is of relatively thick construction, the opposite faces of the wheels engaging the inner surfaces of the spaced apart end portions of the link members of the several links.

The construction of each cutting wheel is of importance, and as will be observed, each cutting wheel is formed with a cutting blade disposed medially between the opposite faces thereof, said cutting blade being cross-sectionally tapered and being adapted to bite into the surface of the pipe P to be cut.

At opposite sides of the cutting blade of each wheel, I form circumferential shoulders 60, which are knurled or otherwise roughened throughout their peripheries, said shoulders being formed to a somewhat smaller diameter than the outer diameters of the several cutting blades of the wheels.

As will be noted, the respective shoulders 60 extend outwardly from the cutting blade of each wheel in a plane perpendicular to the plane of the wheel itself, thus to be disposed in parallelism with the surface of the pipe P to be cut, and thereby be positioned to bind tightly against the surface of said pipe when the pipe wall is cut through by the cutting blade.

The invention includes as a further important feature spacer lugs 62, that are rigidly secured to the inner surfaces of the intermediate portions 46 of the respective link members, said spacer lugs having rounded heads contacting one another as best shown in Figure 2. In this connection, each cutting wheel is disposed between the spacer lugs of one link, this being the link on which the wheel is mounted, and the contacting ends 48 of the next adjacent link, this construction being such as will cause the spacer lugs to coact with said contacting ends to provide spacers at diametrically opposite locations relative to the cutting wheel, that will prevent the link members from binding against the cutting wheel during the use of the tool. Additionally, the construction illustrated and described is one which assures perfect tracking when the tool is applied to the pipe P, it being essential that the cutting blades of the several wheels follow one another in a straight line without lateral deviation or "wobble."

In use, the pipe P would normally be placed in a suitable pipe vise, not shown, after which the cutter chain 26 is circumposed about the pipe, the bifurcated end 20 of the head 16 engaging the chain at a selected location longitudinally of the chain. Thereafter, the adjusting nut 30 is threaded on the screw 24 in the direction of the head 16, until the spring 36 is partially compressed. The handle 10 is then gripped, and is rocked back and forth several times, after which the spring is further compressed. In this connection, it is desirable that the spring not be tightened to such an extent as would prevent oscillative movement of the handle 10.

This operation is repeated several times, and as a final result, the pipe P will be broken off cleanly and squarely.

As soon as the cutting blades of the several cutting wheels 28 break through the pipe wall, the spring 36, tending to expand, will cause the shoulders 60 to grip the cut-off piece of pipe instantaneously, as a result of which said cut-off piece is held within the tool, and will not drop to the floor surface therebelow. This is of importance, since heretofore, the cut-off piece will often drop, and be broken, particularly where said piece is formed of a highly brittle material such as cast iron. The dropping and breaking of the piece which has been cut off, in many instances, causes chips to fly in the direction of the user of the tool or other persons in the immediate vicinity, raising the possibility of serious injury.

It is also believed worthy of note that the anti-friction means 32, 34 embodied in the tool permits the spring 36 to be tightened to any extent desired, with complete ease, since the free rotation of the adjusting nut 30 is assured at all times. This is of particular importance, since the continuously increased pressure has heretofore made the rotation of the adjusting nut increasingly more difficult.

The feature whereby the links are formed of a pair of link members arranged as shown in Figure 2 is also considered to be of considerable importance, since the construction reduces the number of link components substantially and permits pre-assembly of the cutting wheels with said link members, it being necessary, after said pre-assembly, only to extend the connecting pins or rivets 52 through their proper openings for the purpose of completing the assembly of the chain.

Additionally, the cooperating action between the spacer lugs 62 and the contacting ends 48 is an important characteristic of the invention, since approximately 1,500 pounds of pressure is applied to the chain when the spring pressure is increased. This would normally tend to force the link members toward one another, tending to bind the wheels 28. The spacer lugs eliminate this tendency, while assuring retention of the cutting blades of the wheels in a straight line.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

In a pipe cutter, a chain including a plurality of links pivotally connected to one another in end to end relationship, each link including a pair of identical oppositely disposed link members, each link member having an intermediate portion and first and second portions respectively extending from said intermediate portion with the first portion shorter in length than the second portion and offset relative to the second portion, the intermediate portions of the pair of link members converging in the direction of the shorter portions, the shorter portions of the link members of each link extending in longitudinal contact with each other and embraced between and overlapped by the longer portions of the link members of a next adjacent link; means pivotally connecting the shorter portions of one link to the overlapping, longer portions of said next adjacent link; cutter wheels rotatably mounted on and between the longer portions of each link; and spacer lugs on said intermediate portions of each link disposed adjacent the periphery of the cutter wheel of the same link, to prevent movement of the midlength parts of the link members of each link toward one another.

References Cited in the file of this patent

UNITED STATES PATENTS

| | | |
|---|---|---|
| 294,339 | Sweetland | Feb. 26, 1884 |
| 373,983 | Jeffrey | Nov. 29, 1887 |
| 402,637 | Whiteley | May 7, 1889 |
| 1,020,580 | Smith | Mar. 19, 1912 |
| 1,428,712 | Sanders | Sept. 12, 1922 |
| 1,938,056 | Taylor | Dec. 5, 1933 |